April 24, 1928.

C. W. PRESCOTT 1,666,911

SWITCH OPERATOR SELECTOR

Filed May 20, 1926

INVENTOR
C. W. Prescott,
BY
Neil D. Reston,
his ATTORNEY

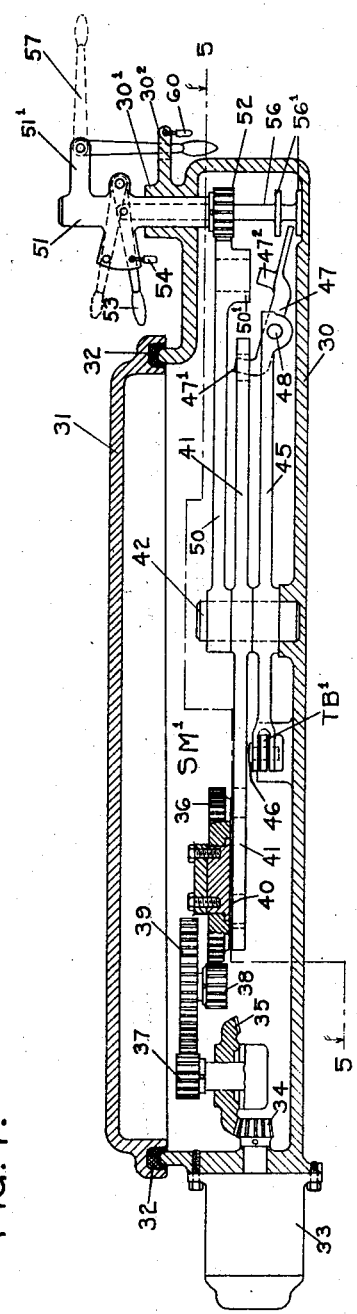

Patented Apr. 24, 1928.

1,666,911

UNITED STATES PATENT OFFICE.

CHARLES W. PRESCOTT, OF ROCHESTER, NEW YORK, ASSIGNOR TO GENERAL RAILWAY SIGNAL COMPANY, OF ROCHESTER, NEW YORK.

SWITCH-OPERATOR SELECTOR.

Application filed May 20, 1926. Serial No. 110,394.

This invention relates to mechanism whereby a railway track switch may be connected so as to be operable by the usual switch stand or by a power operated switch machine, as conditions require, which mechanism may for convenience be called "switch selector."

The use of power operated switch machines for operating track switches is quite common in modern railway systems, and their use is still more common in interlocking plants of such systems. The use of switch machines greatly facilitates the movement of trains, in that the switches may be operated by operators or tower men at a centralized point, but under certain operating conditions a switch machine of the usual construction is disadvantageous. Although if conditions require, due to the failure of energy for operating the switch machine, or the like, the switch machine may be cranked by hand, there are other instances where neither the operation of the switch machine by power nor by cranking it by hand satisfies the requirements. For instance, there are times when it is desirable to be able to throw the switch by hand very quickly and at the proper instant; for example, where switching or shifting of cars is carried on it is quite ofter necessary for a car to make a flying switch. By this is meant, acceleration of a car by the locomotive pulling such car, cutting such car loose from the locomotive, and then allowing the locomotive to take one track and quickly throwing the switch and allowing the car to take the other. By employing a switch selector embodying the present invention this may be accomplished by a track switch normally operated by a switch machine by coupling the track switch to a switch stand of the usual construction and then operating the track switch very quickly at the proper instant.

In view of the foregoing and other important considerations, it is proposed in accordance with the present invention to provide double throw mechanical coupling means whereby the switch bar of a track switch may be mechanically coupled to either the operating bar of the usual switch stand or the throw-bar of a power operated switch machine, as conditions require. In another form of the present invention it is proposed to build a unitary structure in a casing from which extends a switch bar for operating a track switch, said casing including the necessary mechanism whereby this switch bar may be operated by a power operable means, or whereby this switch bar may be operated manually fairly directly and without the operation of the power operable means, depending on the position of a suitable selecting device; said casing preferably also including circuit closing means for indicating the position of the track switch regardless of whether the track switch is operated by the power operable means or is operated manually.

Other objects, purposes and characteristic features of the invention will be apparent from the drawings and will appear as the description thereof progresses.

In describing the invention in detail reference will be made to the accompanying drawings in which:

Fig. 4 is a sectional elevation taken through the casing, shown in Fig. 5, of a modified form of the present invention; and Fig. 5 is a partial horizontal section taken on the line 5—5 of Fig. 4, as viewed in the direction of the arrows.

Figure 1:
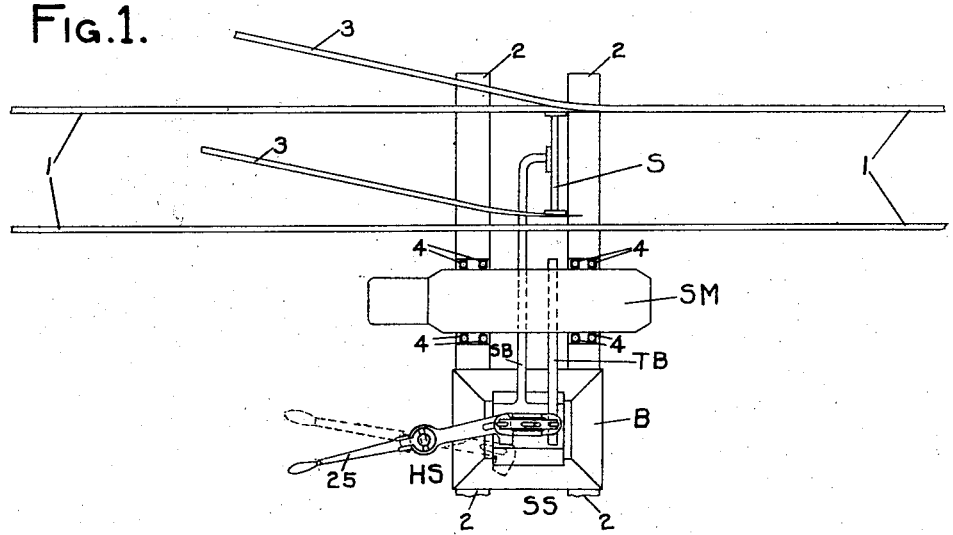
Fig. 1 shows a track switch layout, including a power operated switch machine and a switch stand associated therewith, to which one form of switch selector embodying the present invention has been shown applied for connecting the track switch for operation by either the switch machine or the switch stand.

Referring to Fig. 1 in which one specific embodiment of the invention has been shown, this figure illustrates a main track comprising rails 1 supported on ties 2, from which diverges the siding comprising rails 3, this siding being connected to the main track through the switch S. To the ties 2 is secured a switch machine SM by bolts 4, which switch machine may be of any suitable construction, such, for instance, as shown in the patent to Howe, No. 1,466,903, patented September 4, 1923.

In the particular arrangement shown the ties 2 also support the base, or guide block, B of a switch selector SS. This guide block or base has an upstanding arm B¹, which forms the base for the usual switch stand HS. The guide block B has a wide groove cut therein which is undercut to form retaining lips B², so as to afford a guide for guiding the switch bar SB, which in the particular construction shown is rather wide at one end and has its other end curved, as shown, and has its curved end connected to the front rod of the switch S. From this it will appear that the switch bar SB is free to slide in the guide block for moving the switch S into either of its extreme positions.

On the wide portion of the switch bar SB is preferably mounted a pedestal P, having outwardly projecting ears P¹ and P², which are perforated to accommodate the lock plungers 10 and 11, respectively. To the pedestal P is pivotally secured a lock arm 12, from which projects an upstanding lock lever 13. This lock lever 13 is preferably locked in one or the other of its two extreme positions, as by the padlock 14 passing through this lever 13 and one of the holes in the locking sector P³. Directly below the ear P¹ of the switch bar SB are provided guides P⁴ for guiding the throw-bar TB of the switch machine SM, this throw-bar being perforated so that it is locked to the switch bar SB when the lever 13 is in the switch machine position, in which it has been shown.

In the upstanding arm B¹ is pivoted a vertically disposed shaft 20, having pinned thereto a sector 22 (see Figs. 2 and 3), which sector has an oblong slot 23 therein, which is adapted to receive the other lock plunger 11 when the lock lever 13 is moved to the other extreme, or dotted position. To the shaft 20 is preferably pinned a collar 24 having a bifurcated arm, in the bifurcation of which is pivotally secured the lever 25, such as used in the usual switch stand, by a pin 26. This lever 25 is normally in its pendent position, and is preferably located in any suitable way as by a padlock 27.

From this construction it readily appears that if the switch machine SM is operated, with the switch selector SS in its normal position, as shown, the throw-bar TB of the switch machine will slide the wide portion of the switch bar SB in the guides of the guide block B so as to cause the switch S to be operated from one extreme to the other extreme position upon operation of such switch machine from one extreme to the other extreme position. Also, it will readily appear, that if the padlock 14 is removed and the lever 13 is moved to the dotted position, that in so doing the lock plunger 11 is caused to engage the slot 23 and couples the sector 22 to the switch bar SB, and the lock plunger 10 is disengaged from the throw-bar TB, and that thereafter the switch S may be operated by the switch stand HS in the usual manner. In this connection it should be noted that the lock plungers are so related that one plunger can not disengage before the other has already engaged, and thereby assures that the switch bar SB is connected to one or the other of the switch operating devices HS or SM.

Figure 2:
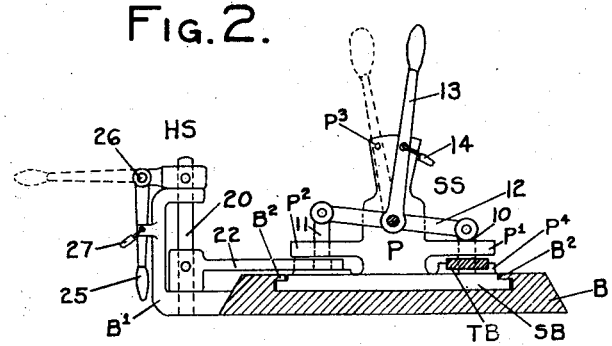
Fig. 2 is an end elevation of the switch selector shown in Fig. 1 with the base thereof shown in cross-section.
Figure 3:
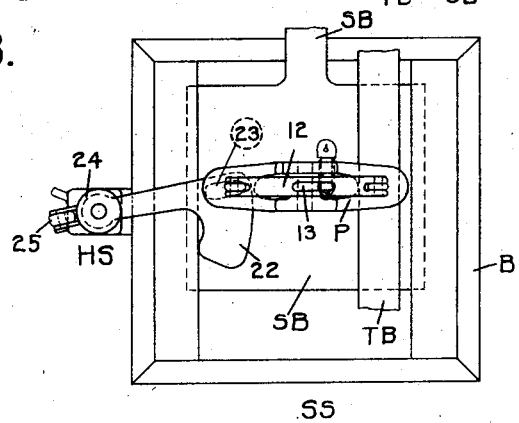
Fig. 3 is a plan view of the switch selector shown in Figs. 1 and 2.

In other words, the construction as illustrated in the first form of the invention shown in Figs. 1, 2, and 3 comprise a switch stand HS of the usual construction, a switch machine SM of the usual construction and a switch selector SS, whereby the track switch S may be operatively connected so as to be operable by either the switch stand SS or the switch machine SM, dependent on the position of suitably normally locked manually adjustable means.

*Modified form.*—In my prior patent application Ser. No. 23,543 filed April 16, 1925, I have disclosed a switch machine of a construction wherein, if the track switch to which such switch machine is connected is trailed by a railway car the switch machine will not be damaged, this because a suitable mechanical detent mechanism will permit operation of the switch points by such trailing car without rotating the driving gearing and motive power means. In accordance with the present invention it is proposed to modify the switch machine just referred to in a manner as presently described, but in order to avoid unnecessary duplication in this disclosure of many of the parts shown in said application, I have shown the switch machine of my prior application in a conventional or schematic way, that is, certain of the parts of the switch machine have been omitted.

Referring to Fig. 4, there has been shown the casing 30 of the switch machine SM¹, which includes a cover 31 having a groove in the edge thereof containing a gasket 32. To one end of this casing 30 is bolted a suitable motive power means, such as a motor 33, having a shaft containing a bevel pinion 34, which pinion meshes with the bevel gear 35 for driving the spur gear 36 through the pinions 37 and 38 and the spur gear 39, this spur gear 36 having an eccentric pin 40 (see Fig. 5) projecting therefrom. This pin 40 engages the cam slot of the operating member 41, so that this harp 41 is moved about the trunnion 42 as the gear 36 is moved from one extreme position to the other. In this connection it should be noted that the operating member is moved only through a very small portion of the arc of movement of the pin 40, and that during the rest of the travel of the pin 40 this operating member is locked against returning. On this same trunnion 42, but below the operating member 41 is pivoted an operating arm 45, which has its one extreme end bifurcated and connected to the throw-bar TB¹ by a pin 46. The other extreme end of the operating arm 45 is also bifurcated, but in a vertical plane, and has pivoted therein on a pin 48 a lock section 47, containing lock plungers 47¹ and 47². On the trunnion 42 but above the operating member 41 is contained a gear sector 50, having a downwardly projecting perforated lug 50¹.

From this construction it will appear that if the lock sector assumes the position in which it is shown the operating member 41 is mechanically coupled to the operating arm 45, but that if the locking sector 47 is moved to its other extreme position, the operating arm 45 will be mechanically coupled to the gear sector 50. In the upwardly projecting perforated boss 30¹ of the casing 30 is pivotally supported a hollow shaft, or sleeve 51, which contains a pinion 52, which pinion meshes with the gear sector 50. Within a hollow lug projecting from the sleeve 51 is pivoted a lever 53, which lever may be locked in either of its extreme positions in any suitable manner as by a padlock 54. To an intermediate point of this lever 53 is pinned the rod 56 which has two discs 56¹ contained thereon straddling the lock sector 47. It is thus apparent that if the lever 53 is moved to its extreme upper position, the lock sector 47 will be shifted so as to disconnect the operating arm from operating member 41, and connect this operating arm 45 to the gear sector 50. The hollow sleeve 51 has extending therefrom a bifurcated arm 51¹ in the bifurcation of which is pivotally secured the handle 57. This handle 57 is normally in its vertical pendent position between the forks 30² projecting from the boss 30¹, and is locked in this position by a padlock 60. In order to indicate at a distant point, the position of the track switch operated by the operating arm 45, for signal control and interlocking purposes, this arm 45 has contact segments such as 61 secured thereto but insulated therefrom, which segments are adapted to bridge contact 62 suitably carried by and insulated from the casing 30 for completing suitable indicating circuits, such as the circuits for the indicating lights 64 and 65 which have distinctive colors.

For reasons already mentioned the operation of the switch machine motor 33 and its associated mechanism, as more clearly pointed out in the prior application heretofore mentioned, operates the throw-bar TB¹ from one extreme position to the other extreme position when conditions require such operation. Let us now assume that it is desired to operate the track switch connected to throw bar TB¹ very quickly and at an instant which the operator at the distant tower can not determine. In order to do this, a man of the train crew will remove the padlock 54 and move the lever 53 to the upper dotted position, and will then again lock this lever 53 in this upper position by the same padlock. This operation of the handle 53 causes the discs 56¹ to operate the locking sector 47 to its upper position in which the lock plunger 47² engages the perforated boss 50¹ of the gear sector 50, and disengages the lock plunger 47¹ from the harp 41. In this connection it should be noted that the operative connection between the discs 56¹ and the locking sector 47 is present regardless of the position of the operating arm 45, and that the locking sector can not be shifted unless the gear 50, operating arm 45 and operating member 41 all assume corresponding positions, and also that the lock plungers 47¹ and 47² lock in overlapped relation, so that the operating arm 45 is always locked to one or the other of members 41 and 45. If now, the man of the train crew wishes to operate the switch connected to the throw-bar TB¹ he will remove the padlock 60, move the lever 57 to its horizontal dotted position, and then operate this lever 57 about the shaft 56 within the boss 30¹, so as to cause the pinion 52 to operate the gear sector 50, which gear sector 50 through the medium of the lock plunger 47² operates the operating arm 45 and in turn the throw-bar TB¹. It may be pointed out that the arrangements of parts are preferably such that the handle 57 must be moved through an arc of substantially 180 degrees for movement of the track switch from one to the other extreme position.

After the switch has been so operated the lever 57 may again be dropped to its vertical position in which it may be locked by the padlock 60 passing through another pair of perforated ears (not shown) projecting from the boss 30¹. After the various manual operations of the track switch have been made, the motor driven mechanism of the switch machine may again be coupled to the operating arm 45 by movement of the lever 53 to its lower normal position. It is desired to point out at this time that at times the position of the lever 57 may not correspond to that of the operating arm 45, and in this event it will be necessary for the person trying to operate the switch by hand to first move the lever 57 to the proper position to enable the lock plunger 47² to engage in the hollow boss 50¹. Likewise in shifting from hand to machine operation, if lock plunger 47¹ be not, at the time, in registry with the opening in operating arm 41, this arm 41 is to be operated by the switch machine to effect the necessary registry.

Having thus shown and described two specific embodiments of the invention, and having shown rather specific structure for accomplishing the desired functions, it is desired to be understood that this has been done for the purpose of clearly disclosing the invention, rather than for the purpose of showing the precise structure preferably employed in practicing the invention or illustrating the scope thereof; and it is desired to be understood that various changes, modifications and additions may be made in applying the invention to the particular circumstances and local conditions encountered in practice without departing from the nature or scope of the invention, or the idea of means underlying the same.

What I desire to secure by Letters Patent is:—

1. In combination with a railway track switch, power operated means for operating the track switch, a separate switch stand of the usual construction for operating the track switch, and means for operatively connecting said track switch to said power operated means or said switch stand while disconnecting it from said switch stand or power operated means respectively.

2. In combination with a railway track switch, power operated means for operating the track switch, a switch stand of the usual construction for operating the track switch, and selecting means including a lever adapted to be locked in either of two extreme positions which if in one extreme position operatively connects said track switch to said power operated means and when in the other position connects said track switch to said switch stand.

3. In combination with a railway track switch, power operated means for operating the track switch, manually operable means for operating the track switch, and means for operatively connecting said track switch to said power operated means or to said manually operable means including a lever having two extreme positions, and means for locking said lever in either of said extreme positions.

4. In combination with a railway track switch, power operated means for operating the track switch, a switch stand of the usual construction for operating the track switch, and means including a lever adapted to be locked in either of two extreme positions which if in one extreme position operatively connects said track switch to said power operated means and when in the other extreme position connects said track switch to said switch stand, said means being so constructed that the track switch can not be disconnected from said power operated means until the track switch has been connected to said switch stand, and vice versa.

5. In combination with a casing, a switch bar extending through a wall of said casing and adapted to be connected to a railway switch for operating the same, power operated means within said casing, a lever projecting from said casing, and means within said casing and manually operable from without said casing to positions for operatively connecting said switch bar to said lever or to said power operated means.

6. In combination with a casing, a switch bar extending through a wall of said casing and adapted to be connected to a railway switch for operating the same, power operated means within said casing for operating said switch bar, a handle for manually operating said switch bar, means for operatively connecting said switch bar to said power operated means or to said handle, and means for indicating the position of said switch bar regardless of whether it is operatively connected to said power operated means or to said handle.

7. In combination with a casing, a switch bar extending through a wall of said casing and adapted to be connected to a railway track switch for operating the same, power operated means within said casing for operating said switch bar, manually operable means for operating said switch bar including a handle projecting from said casing, means to selectively operatively connect the switch bar to the power operated means or the manually operable means, and means for locking said manually operable means in either of its operating positions.

8. In combination with a railway track switch, a switch machine of the usual construction, a separate switch stand of the usual construction, and means for operatively connecting said track switch to said switch machine alone or said switch stand alone.

9. In combination with a railway track switch, power operated means for operating the track switch, manually operable means for operating the track switch, and means for operatively connecting said track switch to said power operated means only, or to said manually operable means only.

10. In combination with a railway track switch, power operated means for operating the track switch, manually operable means for operating the track switch, and selecting means including a lever adapted to be locked in either of two extreme positions which if in one extreme position operatively connects said track switch to said power operated means and when in the other extreme position operatively connects said track switch to said manually operable means, said selecting means being so constructed that the operative connection can not be shifted over unless said power operated means and said manually operable means are in corresponding positions.

11. In combination, a track switch and switch operating rod, a power operated switch machine and an operated rod, and a hand operated switch stand and an operated rod, and means for operatively connecting the switch rod to the switch machine rod or to the switch stand rod.

12. In a switch operator and selector, a casing, a switch rod in the casing, a second and a third rod in the casing, coupling means for coupling the switch rod with either of the other rods, and manually operable means in the casing for operating one of said other rods.

13. In a switch operator and selector, a single casing, a power operated rod in the casing, a manually operated rod in the casing, a switch rod in the casing, and means to couple the switch rod to either of the other said rods, at will.

14. Track switch operating means, comprising, a switch bar, a connecting member, a power operated rod, a hand operated rod, a coupling means carried by said member, and means for operably engaging the coupling means with either of said rods for either power or hand operation of the switch bar.

15. Track switch operating means, comprising, a casing, a switch bar, a connecting member, a power operated rod, and a hand operated rod, all in said casing, a pivoted yoke shaped coupling means carried by said member, and means including, a collar engaging said coupling means at all times, a rod extending into the casing and carrying the collar at its inner end, and lockable means outside of the casing for operating the said collar and its rod, for operably engaging the coupling means with either of said rods for either power or hand operation of the switch bar.

16. Track switch operating means, comprising, a casing, a switch bar, a connecting member, a power operated rod, and a hand operated rod, all in said casing, a pivoted yoke shaped coupling means carried by said member, and means including, a collar engaging said coupling means at all times, a rod extending into the casing and carrying the collar at its inner end, and lockable means outside of the casing for operating the said collar and its rod, for operably engaging the coupling means with either of said rods for either power or hand operation of the switch bar, a hollow shaft sleeving the collar rod, means on the hollow shaft for manually operating said hand operated rod and a lockable, manually operable, handle for operating the hollow shaft.

In testimony whereof I affix my signature.

CHARLES W. PRESCOTT.